United States Patent
Kohlenberg et al.

(10) Patent No.: US 9,058,324 B2
(45) Date of Patent: Jun. 16, 2015

(54) PREDICTIVE PRECACHING OF DATA BASED ON CONTEXT

(71) Applicant: Intel Corporation, Santa Clara, CA (US)

(72) Inventors: Tobias M. Kohlenberg, Portland, OR (US); Rita H. Wouhaybi, Portland, OR (US); Stanley Mo, Portland, OR (US); Mubashir A. Mian, Morton Grove, IL (US)

(73) Assignee: Intel Corporation, Santa Clara, CA (US)

( * ) Notice: Subject to any disclaimer, the term of this patent is extended or adjusted under 35 U.S.C. 154(b) by 213 days.

(21) Appl. No.: 13/631,565

(22) Filed: Sep. 28, 2012

(65) Prior Publication Data

US 2014/0095943 A1    Apr. 3, 2014

(51) Int. Cl.
 G06F 11/00 (2006.01)
 G06F 11/30 (2006.01)
 G06F 17/30 (2006.01)
 G06F 9/44 (2006.01)
 H04L 29/08 (2006.01)

(52) U.S. Cl.
 CPC .......... *G06F 11/30* (2013.01); *G06F 17/30902* (2013.01); *G06F 11/008* (2013.01); *G06F 8/34* (2013.01); *G06F 11/004* (2013.01); *H04L 29/08* (2013.01)

(58) Field of Classification Search
 CPC ... G06F 17/30902; G06F 8/34; G06F 11/004; G06F 11/008
 See application file for complete search history.

(56) References Cited

U.S. PATENT DOCUMENTS

| | | | |
|---|---|---|---|
| 7,739,138 B2 * | 6/2010 | Chauhan et al. | 705/7.14 |
| 8,117,303 B2 * | 2/2012 | Fonsen | 709/224 |
| 8,769,073 B2 * | 7/2014 | Humphreys et al. | 709/223 |
| 8,775,598 B2 * | 7/2014 | Humphreys et al. | 709/223 |
| 2005/0055426 A1 | 3/2005 | Smith et al. | |
| 2007/0011334 A1 * | 1/2007 | Higgins et al. | 709/227 |

(Continued)

FOREIGN PATENT DOCUMENTS

WO    2013100915 A1    7/2013

OTHER PUBLICATIONS

International Search Report and Written Opinion received for PCT Application No. PCT/US2013/062324, mailed on Jan. 17, 2014, 12 pages.

(Continued)

*Primary Examiner* — Charles Ehne
(74) *Attorney, Agent, or Firm* — Barnes & Thornburg LLP

(57) ABSTRACT

A device and method for predictively precaching content on a mobile communication device includes monitoring numerous data sources for contextual data on the activities of the user. The mobile communication device predicts network connectivity outages and affected applications using the contextual data. The mobile communication device notifies the affected applications of the predicted network connectivity outage, and in response the affected applications precache suitable content. The affected applications may employ several precaching strategies in response to the notification, such as downloading content from a remote content server, adjusting content streaming, or adjusting content buffering prior to the predicted network connectivity outage. During the network outage, application service is provided using the precached content. Such precaching may also be accomplished using a local caching proxy server.

23 Claims, 7 Drawing Sheets

(56) References Cited

U.S. PATENT DOCUMENTS

2007/0219708 A1 9/2007 Brasche et al.
2009/0006308 A1* 1/2009 Fonsen ............................ 707/1
2009/0182835 A1 7/2009 Aviles et al.
2010/0121977 A1* 5/2010 Kontola et al. ............... 709/232
2011/0040718 A1 2/2011 Tendjoukian et al.
2011/0055202 A1 3/2011 Heimendinger

OTHER PUBLICATIONS

"Link prefetching," Wikipedia, The Free Encyclopedia, retrieved from: <http://en.wikipedia.org/w/index.php?title=Link_prefetching&oldid=427432842>, edited May 4, 2011, 3 pages.

"Data buffer," Wikipedia, The Free Encyclopedia, retrieved from: <http://en.wikipedia.org/w/index.php?title=Data_buffer&oldid=475778852>, edited Feb. 8, 2012, 3 pages.

* cited by examiner

PREDICTIVE PRECACHING OF DATA BASED ON CONTEXT

BACKGROUND

Mobile communication devices provide various applications for users to access desired content stored on remote servers. Mobile content applications generally require an active network connection to access new content. Some applications download content such as media files to the mobile communication device prior to allowing the user to access the content. For example, e-reader applications allow users to download and access books and other documents. Other applications stream content to the mobile communication device, allowing the user to access the content prior to it being completely downloaded. For example, streaming audio applications allow users to access large libraries of music without requiring lengthy downloads. Some applications buffer the content to account for short, unplanned outages in network connectivity.

Wireless networks used by mobile communication devices provide widespread, but not universal coverage. For example, cellular networks generally have high-quality coverage in populated areas but reduced coverage in remote areas. Wi-Fi® networks may provide coverage in certain buildings or rooms within buildings but not others. Additionally, environmental factors may impact wireless network availability. For example, wireless networks may not be available underground, for example, in a subway system. Also, policies may impact wireless network availability. For example, wireless communications are usually not allowed inside airplanes.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
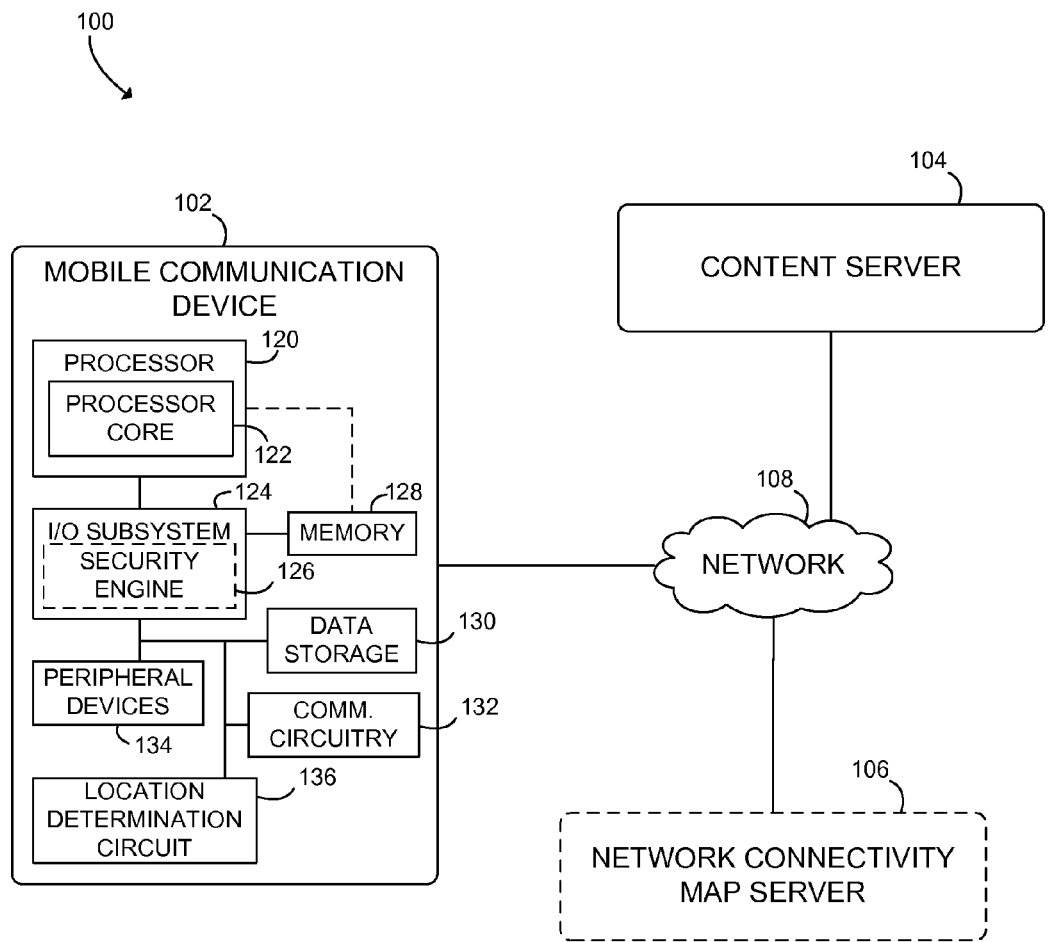
FIG. 1 is a simplified block diagram of at least one embodiment of a system for predictive precaching of data based on context data.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for predictive precaching of data based on user context includes a mobile communication device 102 and a content server 104 in communication over network 108. As discussed in more detail, the mobile communication device 102 monitors multiple data sources to determine the user's context and thereby predict network connectivity outages. In some embodiments, the mobile communication device 102 may communicate with a network connectivity map server 106 in order to predict network connectivity outages. In response to predicting a network connectivity outage, one or more applications running on the mobile communication device 102 may precache appropriate content from the content server 104.

The disclosed predictive precaching allows the mobile communication device 102 to provide desired content for network outages without requiring user intervention. For scheduled network outages, e.g., flights, offline content is made available without requiring the user to perform a potentially time-consuming and inconvenient download ahead of time. For unscheduled network outages, offline content is made available in circumstances when the mobile communication device may otherwise be unusable.

The mobile communication device 102 may be embodied as any type of communication device capable of performing the functions described herein. For example, the mobile communication device 102 may be embodied as, without limitation, a smart phone, a cellular telephone, a handset, a messaging device, a vehicle telematics device, a computer, a tablet computer, a laptop computer, a notebook computer, a mobile computing device, a work station, a network appliance, a web appliance, a distributed computing system, a multiprocessor system, a processor-based system, a consumer electronic device, a digital television device, and/or any other communication device configured to predictively precache data based on context. In the illustrative embodiment of FIG. 1, the mobile communication device 102 includes a processor 120, an I/O subsystem 124, a memory 128, a data storage 130, a communication circuitry 132, and one or more peripheral devices 134. In some embodiments, several of the foregoing components may be incorporated on a motherboard or main board of the mobile communication device 102, while other components may be communicatively coupled to the motherboard via, for example, a peripheral port. Furthermore, it should be appreciated that the mobile communication device 102 may include other components, sub-components, and devices commonly found in a communication and/or computing device, which are not illustrated in FIG. 1 for clarity of the description.

The processor 120 of the mobile communication device 102 may be embodied as any type of processor capable of executing software/firmware, such as a microprocessor, digital signal processor, microcontroller, or the like. The processor 120 is illustratively embodied as a single core processor having a processor core 122. However, in other embodiments, the processor 120 may be embodied as a multi-core processor having multiple processor cores 122. Additionally, the mobile communication device 102 may include additional processors 120 having one or more processor cores 122.

The I/O subsystem 124 of the mobile communication device 102 may be embodied as circuitry and/or components to facilitate input/output operations with the processor 120 and/or other components of the mobile communication device 102. In some embodiments, the I/O subsystem 124 may be embodied as a memory controller hub (MCH or "northbridge"), an input/output controller hub (ICH or "southbridge"), and a firmware device. In such embodiments, the firmware device of the I/O subsystem 124 may be embodied as a memory device for storing Basic Input/Output System (BIOS) data and/or instructions and/or other information (e.g., a BIOS driver used during booting of the mobile communication device 102). However, in other embodiments, I/O subsystems having other configurations may be used. For example, in some embodiments, the I/O subsystem 124 may be embodied as a platform controller hub (PCH). In such embodiments, the memory controller hub (MCH) may be incorporated in or otherwise associated with the processor 120, and the processor 120 may communicate directly with the memory 128 (as shown by the dashed line in FIG. 1). Additionally, in other embodiments, the I/O subsystem 124 may form a portion of a system-on-a-chip (SoC) and be incorporated, along with the processor 120 and other components of the mobile communication device 102, on a single integrated circuit chip.

In some embodiments, the I/O subsystem 124 may include a security engine 126. The security engine 126 may be embodied as any type of processor capable of performing secure execution of instructions or providing security services to the main processor 120. For example, the security engine 126 may be embodied as a trusted platform module, a manageability engine, a cryptographic accelerator processor, or the like. In some embodiments, the security engine 126 is embodied as an embedded out-of-band microprocessor, separate from processor 120, capable of executing code and addressing data inaccessible to the processor 120. Such strict separation of the processor 120 and the security engine 126 may enhance platform security.

In some embodiments, the processor 120 may include instructions allowing the establishment of a secure execution environment. A secure execution environment is an execution environment including code and data that cannot be accessed from a primary execution environment due to hardware restrictions. Exemplary secure execution environments include secure enclaves, trusted execution technology, virtualized partitions, or the like.

The processor 120 is communicatively coupled to the I/O subsystem 124 via a number of signal paths. These signal paths (and other signal paths illustrated in FIG. 1) may be embodied as any type of signal paths capable of facilitating communication between the components of the mobile communication device 102. For example, the signal paths may be embodied as any number of point-to-point links, wires, cables, light guides, printed circuit board traces, vias, bus, intervening devices, and/or the like.

The memory 128 of the mobile communication device 102 may be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 128 is communicatively coupled to the I/O subsystem 124 via a number of signal paths. Although only a single memory device 128 is illustrated in FIG. 1, the mobile communication device 102 may include additional memory devices in other embodiments. Various data and software may be stored in the memory 128. For example, one or more operating systems, applications, programs, libraries, and drivers that make up the software stack executed by the processor 120 may reside in memory 128 during execution.

The data storage 130 may be embodied as any type of device or devices configured for the short-term or long-term storage of data. For example, the data storage 130 may include any one or more memory devices and circuits, memory cards, hard disk drives, solid-state drives, or other data storage devices. The data storage 130 may store one or more data sources used to monitor contextual data of the user, as described in more detail below. Additionally, the data storage 130 may be used to store preached content prior to any predicted network connectivity outage. Accordingly, the data storage may provide encrypted or secure storage areas for content, using any combination of secure software, hardware, firmware, or other conventional digital rights management techniques. In some embodiments, the mobile communication device 102 may use the security engine 126 in conjunction with the data storage 130 to provide secure storage areas for content.

The communication circuitry 132 of the mobile communication device 102 may include any number of devices and circuitry for enabling communications between the mobile communication device 102 and one or more devices or networks as discussed in more detail below. The communication circuitry 132 may be configured to use any one or more, or combination thereof, communication protocols to communicate, such as, for example, a cellular communication protocol (e.g., Wideband Code Division Multiple Access (W-CDMA)), a wireless network communication protocol (e.g., Wi-Fi®, WiMAX), a wireless personal area network communication protocol (e.g., Bluetooth®), a wired network communication protocol (e.g., TCP/IP), and/or other communication protocols.

In some embodiments, the mobile communication device 102 may also include one or more peripheral devices 134. Such peripheral devices 134 may include any number of additional input/output devices, interface devices, and/or other peripheral devices. For example, in some embodiments, the peripheral devices 134 may include a display, touch screen, graphics circuitry, keyboard, speaker system, and/or other input/output devices, interface devices, and/or peripheral devices.

In the illustrative embodiment, the mobile communication device 102 includes a location determination circuit 136. The location determination circuit 136 may be embodied as any type of circuit capable of determining the precise or approximate position of the mobile communication device 102. For example, the location determination circuit 136 may be embodied as a global positioning system (GPS) receiver, capable of determining the precise coordinates of the mobile communication device 102. In other embodiments, the location determination circuit 136 may triangulate the position of the mobile communication device 102 using distances or angles to cellular network towers with known positions, provided by the communication circuitry 132. In other embodiments, the location determination circuit 136 may determine the approximate position of the mobile communication device 102 based on association to wireless networks with known positions, using the communication circuitry 132.

As discussed in more detail below, the mobile communication device 102 is configured to transmit and receive data with the content server 104 and, optionally, the network connectivity map server 106 over the network 108. The network 108 may be embodied as any number of various wired and/or wireless networks. For example, the network 108 may be embodied as or otherwise include a wired or wireless local area network (LAN), a wired or wireless wide area network (WAN), and/or a publicly-accessible, global network such as the Internet. As such, the network 108 may include any number of additional devices, such as additional computers, routers, and switches, to facilitate communications between the mobile communication device 102, the content server 104, and, optionally, the network connectivity map server 106.

The content server 104 is configured to provide content to the mobile communication device 102, as discussed in more detail below. The network connectivity map server 106 is configured to provide a network connectivity map upon request to the mobile communication device 102, as discussed in more detail below. The content server 104 and the network connectivity map server 106 may be embodied as any type of data server (e.g., a web server) or similar computing device capable of performing the functions described herein. As such, the content server 104 and the network connectivity map server 106 may include components and features similar to the mobile communication device 102, such as a processor, I/O subsystem, memory, data storage, communication circuitry, and various peripheral devices, which are not illustrated in FIG. 1 for clarity of the present description.

Figure 2:
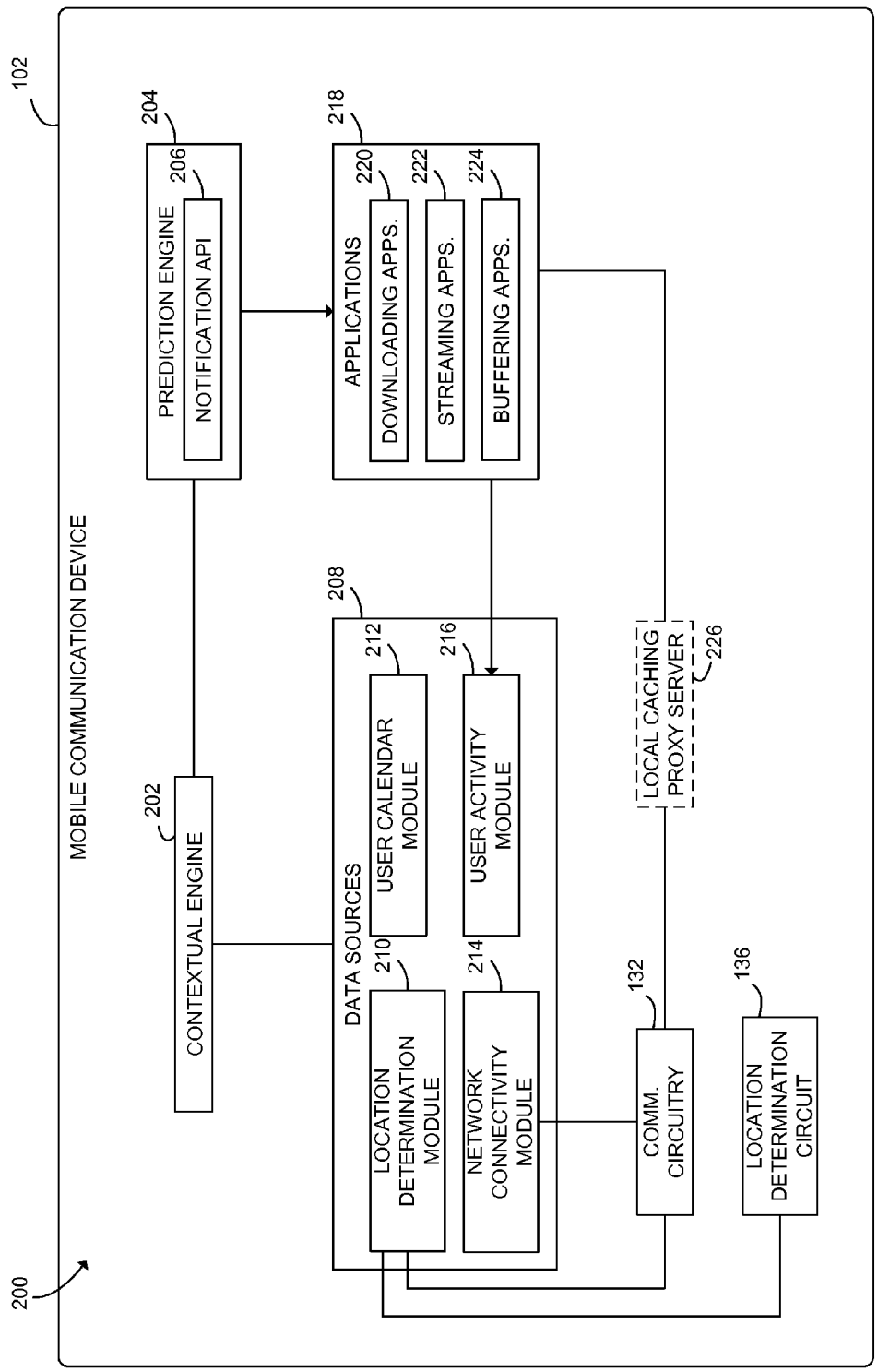
FIG. 2 is a simplified block diagram of at least one embodiment of an environment of a mobile communication device of the system of FIG. 1.

Referring now to FIG. 2, in one embodiment, the mobile communication device 102 establishes an environment 200 during operation. The illustrative environment 200 includes a contextual engine 202, a prediction engine 204, one or more data sources 208, and one or more applications 218. In some embodiments, the environment 200 may include a local caching proxy server 226. The various modules of the environment 200 may be embodied as hardware, firmware, software, or a combination thereof.

The contextual engine 202 is configured to monitor and aggregate multiple data sources 208 to determine contextual information about the mobile communication device 102 and the user. Such contextual information may be embodied as historical information, current information, or planned future information. In some embodiments the contextual engine 202 may maintain its own storage of information received from the data sources 208. In other embodiments, the contextual engine 202 may query the data sources 208 for information as needed. Of course, the strategy used by the contextual engine 202 for accessing the data may depend on the particular data sources monitored of the data sources 208.

The data sources 208 monitored by the contextual engine 202 may be embodied as a location determination module 210, a user calendar module 212, a network connectivity module 214, and a user activity module 216. The location determination module 210 is configured to determine the precise or approximate position of the mobile communication device 102 using information received from the location determination circuit 136 and/or the communication circuitry 132. The user calendar module 212 is configured to provide information on the user's appointments and may provide information on the user's general schedule, e.g., typical wake times, sleep times, and working hours. The user calendar module 212 may store information local to the mobile communication device 102 or may retrieve information from a remote calendar server (not shown). The network connectivity module 214 is configured to provide information on available network connectivity for the mobile communication device 102, using the communication circuitry 132. Such information may include wireless signal strength, available wireless bandwidth, network latency, network interface uptime, network identifier (e.g., SSID), or the like. The user activity module 216 is configured to provide information on content consumed by and tasks performed by the user, using information received from one or more of the applications 218. Of course, the data sources 208 illustrated in FIG. 2 are illustrative, and alternative data sources may be included in other embodiments.

The prediction engine 204 is configured to predict network connectivity outages and activities likely to be performed by the user during the predicted network connectivity outages, using contextual data provided by the contextual engine 202. The prediction engine 204 is further configured to notify one or more of the applications 218 predicted to be affected by the network connectivity outages. The prediction engine 204 may include a notification API 206, used to notify the applications 218.

The applications 218 are configured to receive network connectivity outage notifications from the prediction engine 204 and to precache content in preparation for such outages. Applications 218 access content using communication circuitry 132, ultimately interacting with the content server 104 (not shown in FIG. 2). Potential classes of applications may be embodied as downloading applications 220, that is, applications that download content prior to allowing the user to access such content; streaming applications 222, that is, applications that download content continually and allow the user to access the content as it is downloaded; and/or buffering applications 224, that is, applications that buffer a portion of the content while downloading to compensate for short, unplanned network outages. Of course, other types of applications may be used by the mobile communication device 102 in other embodiments.

In some embodiments, the local caching proxy server 226 may mediate interactions between one or more of the applications 218 and the communication circuitry 132. The prediction engine 204 may instruct the local caching proxy server 226 to precache content for such one or more applications of the applications 218. Such one or more applications of the applications 218 may access the precached content via the local caching proxy server 226. It should be apparent to those skilled in the art that such use of the local caching proxy server 226 may allow certain of the applications 218 to be used without modification, for example, without modifying the application to support the notification API 206.

Figure 3:
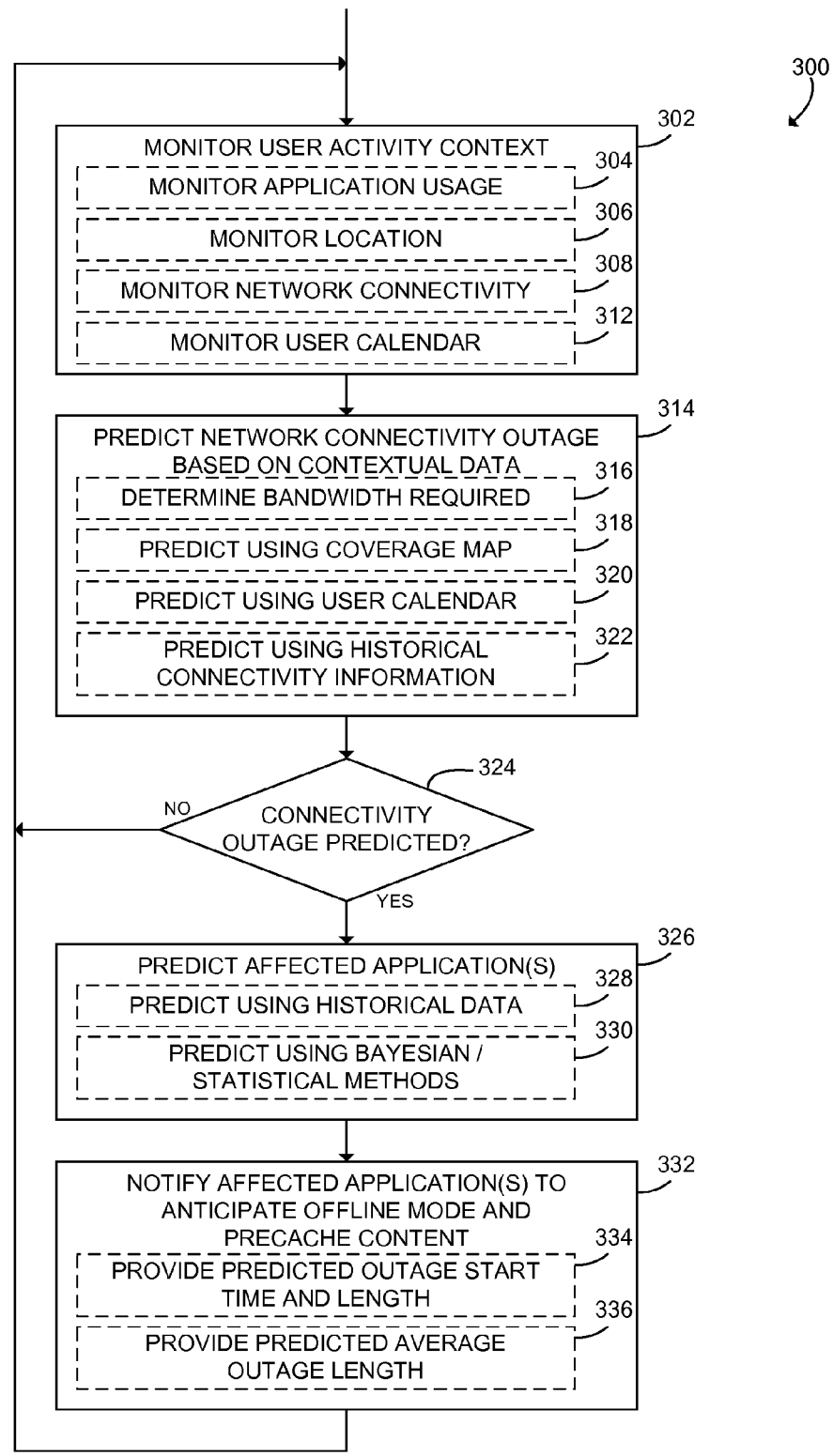
FIG. 3 is a simplified flow diagram of at least one embodiment of a method to predictively precache data based on context data, which may be executed by the mobile communication device of FIGS. 1 and 2.

Referring now to FIG. 3, in use, the mobile communication device 102 may execute a method 300 for predicting network connectivity outages and notifying affected applications. The method 300 begins with block 302 in which the contextual engine 202 monitors contextual data of the user. To do so, the contextual engine 202 monitors at least one of the data sources 208. For example, in block 304, the contextual engine 202 may monitor application usage, using information supplied by the user activity module 216. The user activity module 216 may monitor activity generated by the applications 218. Such application activity may provide information on the user's behavior. For example, use of a video application may indicate the user is watching a video; use of an e-reader application may indicate the user is watching a book, and use of a web browser application may indicate the user is browsing certain websites. Additionally, in block 306, the contextual engine 202 may monitor the location of the mobile communication device 102 using information supplied by the location determination module 210. In block 308, the contextual engine 202 may also monitor network connectivity for the mobile communication device 102 using the network connectivity module 214. Further, in block 312, the contextual engine 202 may monitor the user's calendar using the user calendar module 212. Of course, the mobile communication device 102 may execute some or all of blocks 304, 306, 308, and 312. Additionally, in some embodiments, the contextual engine 202 may monitor data sources other than those illustrated in the method 300.

In block 314, the prediction engine 204 predicts network connectivity outages based on contextual data provided by the contextual engine 202. The prediction engine 204 may perform any number of several prediction methods based on the contextual data. The prediction methods illustrated in FIG. 3 are illustrative; other prediction methods may be possible. In block 316, the prediction engine 204 may determine a threshold network bandwidth required by the mobile communication device 102 to provide application services. The threshold network bandwidth may depend on the applications currently executing or expected to execute on the mobile communication device 102. Network connectivity outages may be predicted where an expected bandwidth for a future time period falls below the threshold network bandwidth. Such a situation may occur, for example, when higher-bandwidth cellular network coverage (e.g., 3G or LTE networks) is expected to be unavailable at a future time.

Figure 4:
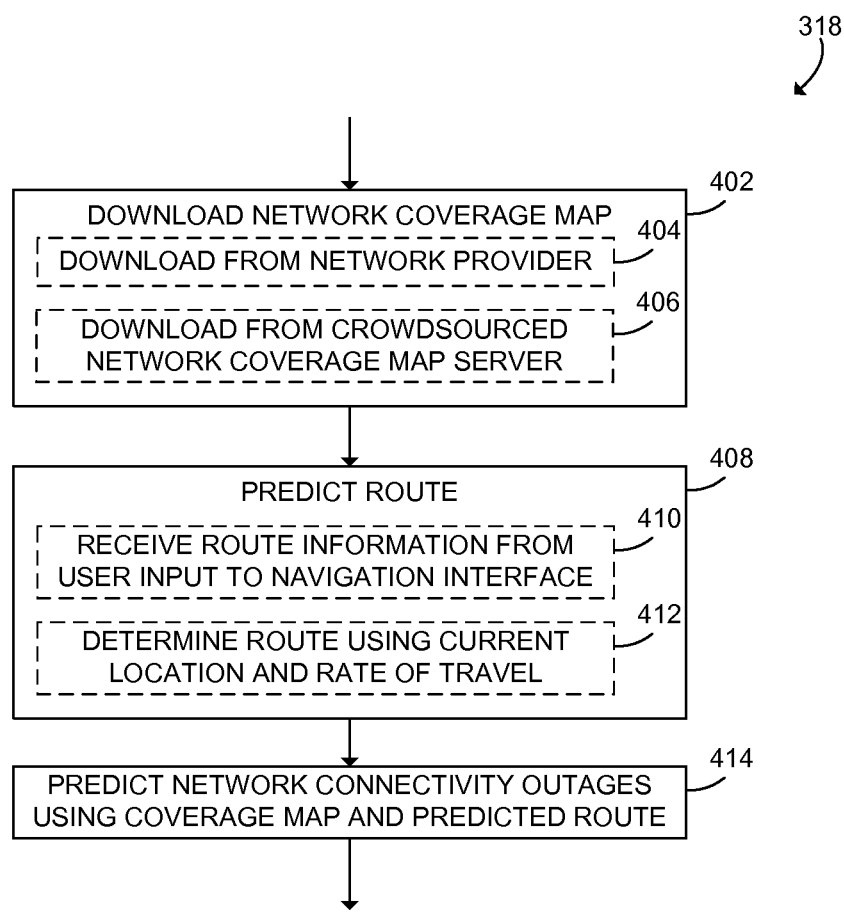
FIG. 4 is a simplified flow diagram of at least one embodiment of a method to predict a network connectivity outage using a network coverage map, which may be executed as a part of the method of FIG. 3.

In block 318, the prediction engine 204 may predict network connectivity outages using the location of the mobile communication device 102 and a network coverage map. Referring now to FIG. 4, the method of block 318 is described in more detail. In block 402, the prediction engine 204 downloads a network coverage map from a network connectivity map server 106. The network coverage map associates geographical data with network coverage information. The network coverage map may identify areas with coverage and areas without coverage, or network coverage map may provide more detailed information on available network bandwidth. In block 404, in some embodiments the prediction engine 204 may download the network coverage map from a network provider, such a as a cellular network provider. The cellular network provider may be the carrier associated with the mobile communication device 102, or may be another carrier, as when the mobile communication device is "roaming" on the network of another carrier. In block 406, in some embodiments, the prediction engine 204 may download the network coverage map from a so-called "crowdsourced" network coverage map server. Such crowdsourced network coverage maps are produced from network connectivity information supplied by other mobile communication devices to the network connectivity map server 106. Accordingly, the mobile communication device 102 may supply the network connectivity map server 106 with information on network connectivity.

In block 408, the prediction engine 204 predicts a likely route of the mobile communication device 102. In block 410, the prediction engine 204 may receive route information from a user input to a navigation interface. For example, in a vehicle telematics embodiment, the mobile communication device 102 may provide a GPS application for vehicle navigation. The user will often directly input a destination address and/or a specific route into the GPS application. In such embodiments, the prediction engine 204 may predict the likely route using this destination and/or route information provided by the user. In block 412, the prediction engine 204 may predict the likely route using the current location and rate of travel of the mobile communication device 102. Such prediction may incorporate geographical information such as road map information. For example, again discussing the vehicle telematics embodiment, the prediction engine may compare location and rate of travel against a road map to determine that the mobile communication device is traveling on an interstate highway, and the prediction engine 204 may use interstate exit information to determine the likely route of the mobile communication device 102. Such prediction may not require user-input destination and/or route information.

In block 414, the prediction engine 204 uses the network coverage map and the predicted route of the mobile communication device 102 to predict network connectivity outages. For example, given a predicted route on an interstate highway and given an area without network connectivity defined on the network coverage map, the prediction engine 204 may predict that the mobile communication device 102 will travel through the area without network connectivity, for example, if no interstate exit is available prior to the area without network connectivity.

Referring back to FIG. 3, the prediction engine 204 may predict network connectivity outages based on user calendar information in block 320. For example, the user may have a flight scheduled in the user's calendar. The prediction engine 204 may reference such calendar information to determine the anticipated duration and start time for such flight. The prediction engine 204 may use this information to predict a network connectivity outage for the corresponding duration and start time. The prediction engine 204 may respond dynamically to changes in the user's calendar monitored by the contextual engine 202. For example, if the user's flight schedule is changed, the prediction engine 204 may adjust the predicted duration and start time for the network connectivity outage accordingly.

In block 322, the prediction engine 204 may predict network connectivity outages based on historical connectivity information. For example, many commuters travel the same route and enter the same buildings at roughly the same time every work day. Such route and buildings may have areas consistently lacking network connectivity. Given contextual data managed by the contextual engine 202 on these brief interruptions in network connectivity, the prediction engine 204 may predict appropriate network connectivity outages on work days. Such predicted network connectivity outages may be embodied as predicted outage start time and duration, or may be embodied as predicted average outage length.

In block 324, the mobile communication device 102 determines whether a network connectivity outage has been predicted. If a network connectivity outage has not been predicted, the method 300 loops back to block 302, and the mobile communication device 102 continues to monitor the user's activity context. If a network connectivity outage has been predicted, the method 300 advances to block 326.

In block 326, the prediction engine 204 predicts any of the applications 218 likely to be affected by the network connectivity outage. In block 328, the prediction engine 204 may predict the affected applications using historical data. For example, given a predicted outage start time and duration, based on past usage information the prediction engine 204 may determine that the user typically reads books and watches movies. Accordingly, the affected applications may include an appropriate movie-watching application and an appropriate e-reader application. In block 330, the prediction engine may use a Bayesian prediction method to predict the affected applications. A Bayesian prediction method allows the prediction engine 204 to update its statistical estimates as additional contextual data is monitored by the contextual engine 202; that is, to tailor its predictions to the particular tendencies and workflow of the user and to adapt to changing usage over time.

In block 332, the prediction engine 204 notifies the affected applications of the network connectivity outage to indicate the affected applications should precache content appropriately. The prediction engine 204 may use the notification API 206 to notify the affected applications. The notification API 206 may communicate with the affected applications using techniques well-known in the art, for example, using inter-process communication techniques such as semaphores, shared memory, network sockets, or the like. In block 334, the prediction engine 204 may provide the predicted start time and predicted duration of the network connectivity outage to the affected applications. Such information is likely to be available, for example, for network connectivity outages due to scheduled downtime such as flights. In block 336, the prediction engine 204 provides the predicted average outage length to the affected applications. Such information is likely to be available, for example, for network connectivity outages predicted based on historical connectivity information regarding frequent and short network outages. Following notification, the affected applications respond by precaching appropriate content, as described in more detail below. Following notification, the method 300 loops back to block 302, and the mobile communication device 102 continues to monitor the user's activity context.

Figure 5:
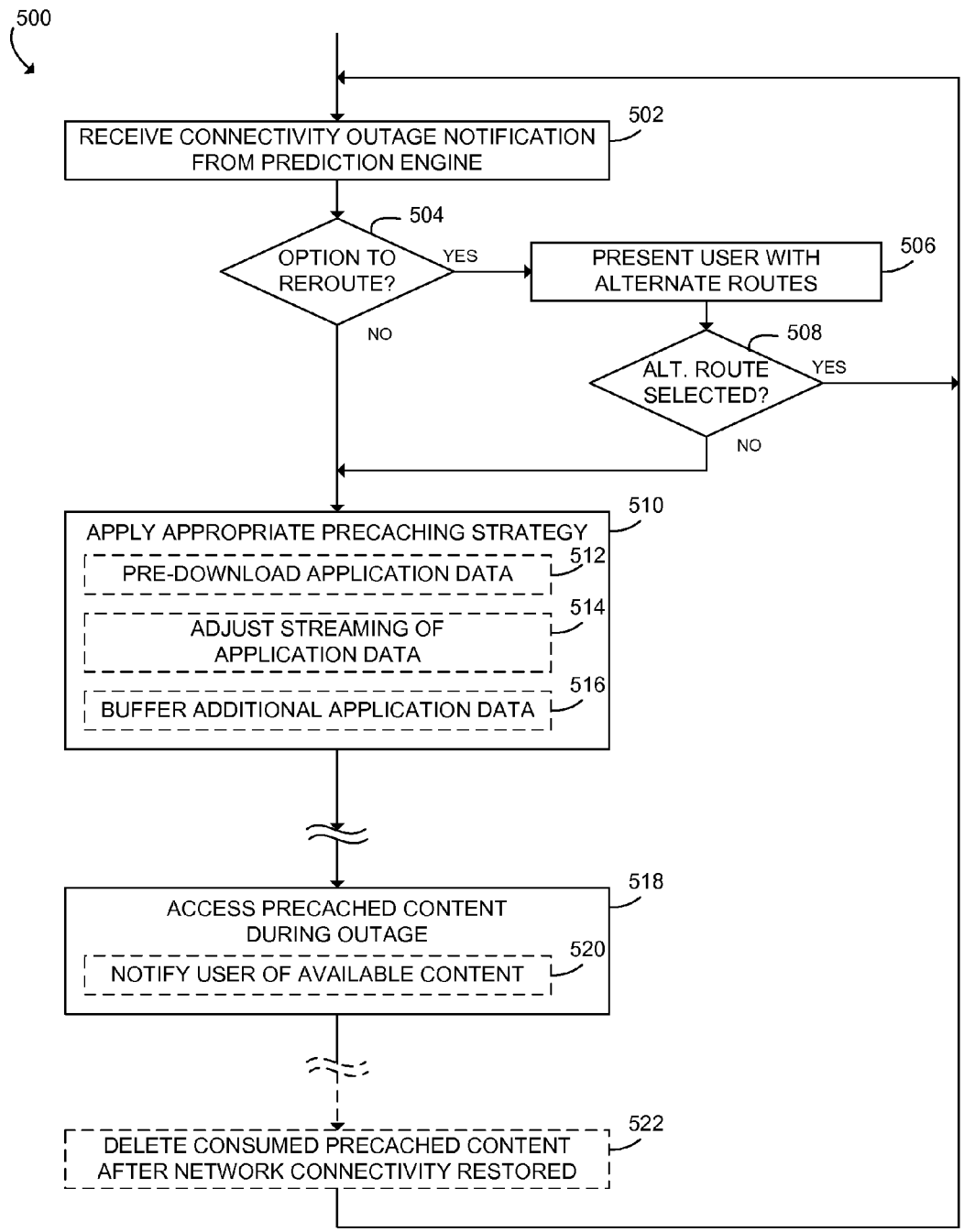
FIG. 5 is a simplified flow diagram of at least one embodiment of a method to precache content in response to a predicted network connectivity outage, which may be executed by the mobile communication device of FIGS. 1 and 2.

Referring now to FIG. 5, in use, the mobile communication device 102 may execute a method 500 for responding to a predicted network connectivity outage by precaching appropriate content. In block 502, an affected application of the applications 218 receives a network connectivity outage notification from the prediction engine 204. The content and techniques for such notification are described in more detail above, in connection with block 332.

In block 504, the application determines whether the network connectivity outage may be avoided by rerouting, that is, by presenting the user with alternate routes that do not involve a network connectivity outage. In some embodiments, rerouting may not be an option. For example, applications without a routing user interface (i.e., "headless" applications) are not capable of presenting alternate routes to the user. In other embodiments, rerouting may not be an option based on circumstances of the predicted network connectivity outage. For example, scheduled outages such as scheduled flights would not be avoidable by rerouting. As another example, no alternative routes may be available, for example, where the user is traveling on an interstate highway and no exit is available between the user and the location of the network connectivity outage. If the application determines that rerouting is an option, the method 500 proceeds to block 506.

In block 506, the application presents the user with one or more alternate routes. The alternate routes are any available route for the mobile communication device 102 to avoid the area of reduced network connectivity associated with the network connectivity outage. The alternate routes may be presented to the user using any appropriate user interface of the mobile communication device 102, for example using a display screen or using audible cues. The alternate routes may be calculated using information received from the prediction engine 204 and/or the contextual engine 202. In block 508, the application determines whether the user has selected an alternate route. If the user selected an alternate route, the method 500 loops back to block 502, wherein the application may receive another notification of a network connectivity outage. If the user does not select an alternate route, the method 500 proceeds to block 510 to handle the network connectivity outage.

Referring back to block 504, if the application determines that rerouting is not an option, the method 500 advances to block 510 to handle the network connectivity outage. In block 510, the application applies a precaching strategy to respond to the network connectivity outage. A precaching strategy allows the affected application to download sufficient content prior to the network connectivity outage to allow the affected application to continue to provide application service during the duration of the network connectivity outage. The particular precaching strategy employed by the application may depend on the attributes of the particular application or may depend on the attributes of the particular network connectivity outage notification. The precaching strategies illustrated in FIG. 5 are illustrative; other precaching strategies may be possible. In block 512, the application may pre-download appropriate content, as discussed in more detail in FIG. 6. Such strategy may be appropriate for applications of the downloading applications 220. In block 514, the application may adjust the streaming of application data, as discussed in more detail in FIG. 7. Such strategy may be appropriate for applications of the streaming applications 222. In block 516, the application may buffer additional application data, as discussed in more detail in FIG. 8. Such strategy may be appropriate for applications of the buffering applications 224.

In block 518, some time after the application has precached content in block 510, the application accesses the precached content during the network connectivity outage. The application may access the precached content using the same mechanisms as any locally stored information, or may stream the preached content from a local source. In block 520, in some embodiments the application may notify the user of available precached content. For example, a reading application may highlight, flag, or otherwise notify the user of the particular books available for reading during the network connectivity outage. In another example, a streaming audio application may provide the user with the predicted length of the precached audio stream.

In block 522, in some embodiments the application may delete the precached content after network connectivity is restored. Deleting the precached content may save storage space in the data storage 130. In some embodiments, deleting the precached content may be required by the user's digital rights management agreement with the content service provider. In some embodiments, the application may query the user whether to delete the precached content. For example, the user may wish to finish reading an article after connectivity has been restored prior to deleting the article. After accessing and potentially deleting the preached content, the method 500 loops back to block 502, wherein the application is prepared to respond to another connectivity outage notification from the prediction engine 204.

Figure 6:
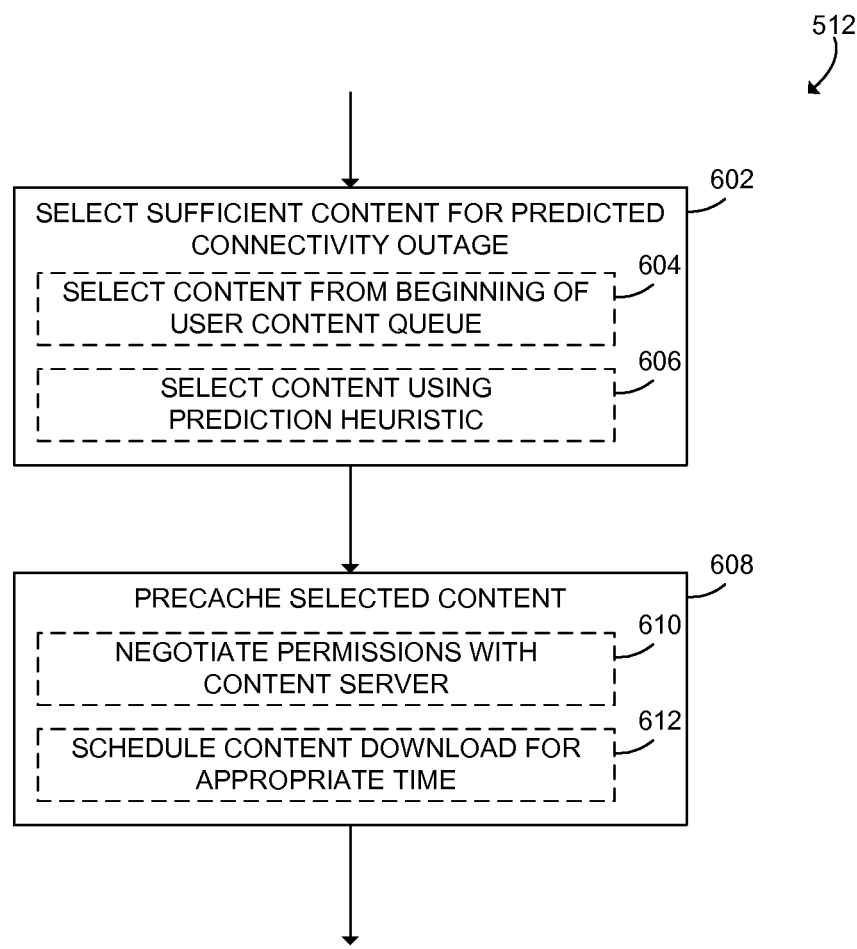
FIG. 6 is a simplified flow diagram of at least one embodiment of a method to pre-download application data, which may be executed as a part of the method of FIG. 5.

Referring now to FIG. 6, the precaching strategy of block 512 is described in more detail. In block 602, the application selects sufficient content for the predicted duration of the network connectivity outage. For example, for content with known duration such as audio or video, the application may select content with total duration longer than the predicted duration of the network connectivity outage. For content with indeterminate duration, such as books or articles, the application may estimate the duration of selected content based on past user behavior or based on standard estimates of content duration. In other embodiments, the amount of selected content may be standardized; for example, a fixed number of movies or books. Also, the amount of selected content may be determined based on, or otherwise limited by, the caching capacity available on the data storage 130 of the mobile communication device 102 For example, the amount of selected content may be based on a percentage of the total free space capacity of the mobile communication device 102, which may be a local hard drive, a local solid state drive, an external flash drive, and/or a network connected storage that may not be impacted by the predicted network outage (e.g., a local Wi-Fi® or ad-hoc connection to other storage equipment).

In block 604, the application selects content based on a user content queue. For example, in some applications the user maintains an ordered list of preferred movies; the application may pick content from the front of the list. In block 606, the application may select content using any appropriate prediction heuristic. For example, the application may select content similar to content previously consumed by the application, or the application may select content that has been started by the user but not yet completed.

In block 608, the application precaches the selected content from the content server 104. Precaching may be embodied as downloading and storing selected content from the content server 104 prior to the predicted start of the network connectivity outage. As discussed above, the amount of content that is precached in block 608 may be a function of the caching storage capacity of the mobile communication device 102. In block 610, the application may negotiate permissions with the content server 104. Such negotiations may be embodied as negotiating encrypted transport and storage of the content, or negotiating potential exceptions to the content server 104's digital rights management policy. The application may provide guarantees that the precached content will be deleted after the network connectivity outage, thus preventing unauthorized content duplication. In block 612, the application may schedule content download for an appropriate time prior to the predicted start time of the network connectivity outage. For example, the download may be scheduled for overnight, when the mobile communication device 102 is generally unused and connected to power. Or the download may be scheduled for a time when the mobile communication device 102 is not in use by the user. In some embodiments, the download time may be coordinated with other mobile communication devices in order to stagger downloads. Such download staggering may avoid flooding wireless communication networks with multiple download requests at the edge of areas with limited network connectivity.

Figure 7:
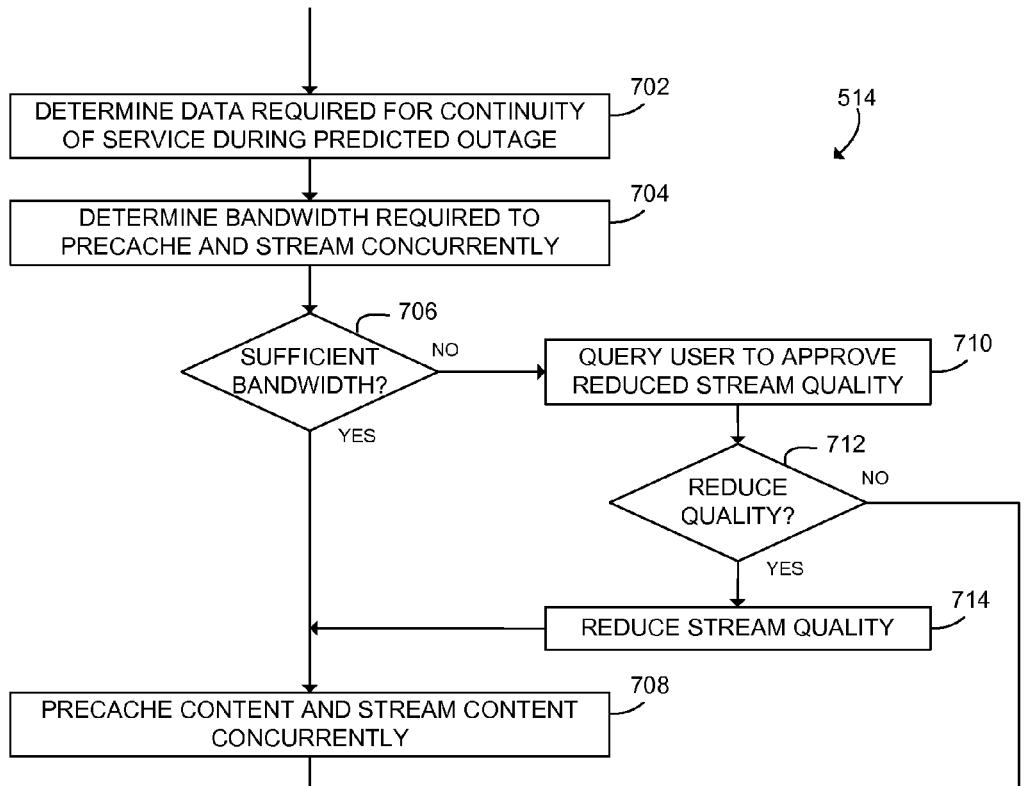
FIG. 7 is a simplified flow diagram of at least one embodiment of a method to adjust streaming of application data, which may be executed as a part of the method of FIG. 5.

Referring now to FIG. 7, the precaching strategy of block 514 is described in more detail. In block 702, the application determines the amount of data required to provide continuous application service during the predicted duration of the network connectivity outage. For example, a streaming audio application may determine the amount of data as a function of the streaming audio bit rate and the predicted duration of the network connectivity outage received in the notification from the prediction engine 204. Of course, the amount of data required to provide the continuation application service may be limited by the storage capacity available on the data storage 130 of the mobile communication device 102.

In block 704, the application determines the amount of bandwidth that would be required to concurrently stream the required amount of precached content while continuing to provide continuous application service. For example, the streaming audio application may determine required bandwidth as a function of (i) the amount of precached content required determined in block 702 and the amount of time remaining until the predicted start of the network connectivity outage, and (ii) the amount of bandwidth currently used for streaming content.

In block 706, the application determines whether the current network connection provides sufficient bandwidth to concurrently precache content and continue to provide application service. If sufficient bandwidth does exist, the precaching strategy of block 514 advances to block 708. In block 708, the application downloads the required precached content and streams application content concurrently.

Referring back to block 706, if sufficient bandwidth does not exist, the precaching strategy of block 514 advances to block 710. In block 710, the application may query the user to approve reduced stream quality in order to precache content. For example, a streaming audio application may reduce the bit rate of current application content in order to free up bandwidth for precaching content. The magnitude of the quality reduction may be determined as a function of the available network bandwidth and the amount of precached content required for the network connectivity outage. In some embodiments (not illustrated) the application may reduce stream quality automatically, i.e. without requesting user permission. However, as reducing stream quality may result in a perceptible loss of quality to the user, it may be advantageous to request permission prior to any reduction in stream quality. In block 712, the application determines whether the user approves reducing stream quality. If the user does not approve reducing stream quality, the precaching strategy of block 514 returns without reducing stream quality or precaching content. In such circumstances, precached content will not be available during the network connectivity outage. If the user approves reducing stream quality, the precaching strategy of block 514 advances to block 714. In block 714, the application reduces the stream quality an appropriate amount, as discussed above. After reducing stream quality, the precaching strategy of block 514 advances to block 708, wherein the application concurrently precaches content and streams content, as discussed above.

Figure 8:
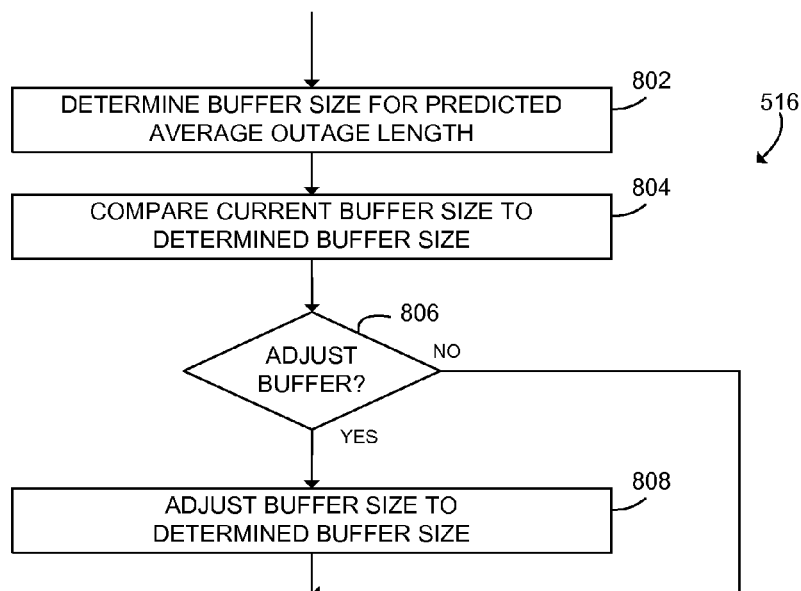
FIG. 8 is a simplified flow diagram of at least one embodiment of a method to buffer additional application data, which may be executed as a part of the method of FIG. 5.

Referring now to FIG. 8, the precaching strategy of block 516 is described in more detail. In block 802, the application determines a required buffer size for the predicted average outage length received from the prediction engine 204. Accordingly, and as discussed in more detail above, the precaching strategy of block 516 may be appropriate where the prediction engine 204 has determined an average predicted outage length, as when multiple short outages are predicted. As discussed above, many applications, particularly of the buffering applications 224, download a relatively small portion of the requested content ahead of processing the content, providing a buffer against short network connectivity outages. The appropriate size of the buffer may be determined as a function of the bit rate of the associated content and the expected duration of any network connectivity outage. Where longer network connectivity outages are expected, the determined buffer size will generally increase.

In block 804, the application compares the current buffer size to the required buffer size determined in block 802. In block 806, the application determines whether to adjust the buffer size. The application may determine to adjust the buffer size if the current buffer size is not equal to the buffer size determined in 802. The application may also apply other criteria to determine whether to adjust the buffer size. For example, the application may maintain a maximum and a minimum buffer size. The maximum buffer size may be a function of, or otherwise limited by, the storage capacity available on the mobile communication device 102. If the application determines not to adjust the buffer size, the precaching strategy of block 516 returns without adjusting the buffer size. If the application determines to adjust the buffer size, the precaching strategy of block 516 advances to block 808, wherein the application adjusts the buffer size to the buffer size determined in block 802.

The methods and precaching strategies illustrated and discussed in connection with FIGS. 5-8 are described as running on an affected application of the applications 218. As should be apparent to those skilled in the art, incorporating such methods and precaching strategies may require modifying such applications. In some embodiments, the mobile communication device 102 may employ the local caching proxy server 226 in order to execute such methods and precaching strategies without extensively modifying affected applications. In such embodiments, the local caching proxy server 226 may be considered an "application" that receives network connectivity outage notifications from the prediction engine 204 and employs precaching strategies as in FIGS. 5-8. The local caching proxy server may select and download appropriate content as in block 512, may precache a content stream as in block 514, and may buffer content as in block 516. In such embodiments, precached content is accessed during the outage by the affected application through the local caching proxy server 226. Such access may be accomplished using conventional means such as network port redirection, network address translation, or the like.

In some embodiments, the local caching proxy server 226 may act as a local caching server for devices other than the mobile computing device 102. For example, the mobile computing device 102 may precache content for consumption by another computing device, such as a laptop computer or other device. Further, in some embodiments, the local caching proxy server 226 may be implemented on a device other than the mobile computing device 102 such as a laptop computer, an in-vehicle computing system, TV set-top box, another mobile computing device, and/or other computing or network device (e.g., a smart router). In such embodiments, the mobile computing device 102 is configured to access the local caching proxy 226 implemented on the other computing device to retrieve content as needed during the network connectivity outage.

EXAMPLES

Illustrative examples of the devices, systems, and methods disclosed herein are provided below. An embodiment of the devices, systems, and methods may include any one or more, and any combination of, the examples described below.

Example 1 includes a mobile communication device to predictively precache data. The mobile communication device includes a contextual engine to monitor contextual data of a user of the mobile communication device; and a prediction engine to: predict a network connectivity outage using the contextual data; predict an application affected by the network connectivity outage using the contextual data; and cause the affected application to apply a precaching strategy to precache content prior to the network connectivity outage.

Example 2 includes the subject matter of Example 1, and wherein the prediction engine is to predict the affected application using a Bayesian prediction method.

Example 3 includes the subject matter of any of Examples 1 and 2, and further includes a security coprocessor, the security coprocessor comprising the contextual engine and the prediction engine.

Example 4 includes the subject matter of any of Examples 1-3, and further includes a secure execution environment, the secure execution environment comprising the contextual engine and the prediction engine.

Example 5 includes the subject matter of any of Examples 1-4, and wherein the prediction engine is to predict the network connectivity outage by determining a bandwidth threshold required by the mobile communication device and determining an expected bandwidth for a future time period that is below the bandwidth threshold.

Example 6 includes the subject matter of any of Examples 1-5, and wherein the contextual engine is to monitor a calendar of the user; and the prediction engine is to predict the network connectivity outage as a function of the calendar of the user.

Example 7 includes the subject matter of any of Examples 1-6, and further includes a location determination circuit, wherein the contextual engine is to monitor the contextual data of the user by determining a location of the mobile communication device using the location determination circuit; and the prediction engine is to predict the network connectivity outage as a function of the location of the mobile communication device and a network coverage map identifying areas of reduced network connectivity.

Example 8 includes the subject matter of any of Examples 1-7, and wherein the prediction engine is to download the network coverage map; predict a route of the mobile communication device as a function of the location of the mobile communication device; and predict the network connectivity outage as a function of the network coverage map and the predicted route of the mobile communication device.

Example 9 includes the subject matter of any of Examples 1-8, and wherein the prediction engine is further to determine an alternate route as a function of the location of the mobile communication device and the predicted route of the mobile communication device, and present the user with the alternate route.

Example 10 includes the subject matter of any of Examples 1-9, and wherein the prediction engine is to download the network coverage map from a third-party network connectivity map server, wherein the third-party network connectivity map server maintains a crowdsourced connectivity map with connectivity information provided by other mobile communication devices.

Example 11 includes the subject matter of any of Examples 1-10, and wherein the contextual engine is to monitor the network connectivity status of the mobile communication device and record historical network connectivity status information; and the prediction engine is to predict the network connectivity outage as a function of the historical connectivity status information.

Example 12 includes the subject matter of any of Examples 1-11, and wherein the contextual engine is to monitor a usage of an application by the user and record historical application usage data of the user; and the prediction engine is to predict the affected application as a function of the historical application usage data.

Example 13 includes the subject matter of any of Examples 1-12, and wherein the prediction engine is further to notify the affected application of the network connectivity outage to cause the affected application to apply the precaching strategy for the affected application to precache content prior to the network connectivity outage and access the precached content during the network connectivity outage.

Example 14 includes the subject matter of any of Examples 1-13, and wherein the prediction engine is to predict a start time and a duration of the network connectivity outage; and cause the affected application to apply the precaching strategy to select content for the predicted duration of the network connectivity outage, and download the selected content prior to the predicted start time of the network connectivity outage.

Example 15 includes the subject matter of any of Examples 1-14, and wherein the prediction engine is to cause the affected application to select content from a user-specified content queue.

Example 16 includes the subject matter of any of Examples 1-15, and wherein the prediction engine is to cause the affected application to select content using a content prediction heuristic.

Example 17 includes the subject matter of any of Examples 1-16, and wherein the prediction engine is to cause the affected application to negotiate content permissions with a content server prior to the predicted start time of the network connectivity outage.

Example 18 includes the subject matter of any of Examples 1-17, and wherein the prediction engine is to cause the affected application to schedule the download of the selected content for a future time prior to the predicted start time of the network connectivity outage.

Example 19 includes the subject matter of any of Examples 1-18, and wherein the prediction engine is to cause the affected application to apply the precaching strategy to determine an amount of the precached content required to provide substantially continuous application service during the network connectivity outage; determine a network bandwidth required to concurrently (i) provide substantially continuous application service and (ii) download the required amount of precached content prior to the network connectivity outage; determine whether a currently available network bandwidth is sufficient as a function of the required network bandwidth; provide reduced-quality continuous application service to reduce the required network bandwidth, in response to determining the currently available network bandwidth is not sufficient; and stream data to concurrently provide continuous application service and download the required amount of precached content prior to the network connectivity outage.

Example 20 includes the subject matter of any of Examples 1-19, and wherein the prediction engine is to predict the network connectivity outage by predicting a plurality of network connectivity outages and determining an average length of the plurality of network connectivity outages; and cause the affected application to apply the precaching strategy to determine a required buffer size as a function of the average length of the plurality of network connectivity outages; determine whether a current buffer size of the application is sufficient as a function of the required buffer size; and adjust the current buffer size of the application to the required buffer size, in response to determining that the current buffer size is not sufficient.

Example 21 includes a mobile communication device to predictively precache data. The mobile communication device includes a contextual engine to monitor contextual data of a user of the mobile communication device; a local caching proxy server; and a prediction engine to predict a network connectivity outage using the contextual data; predict an application affected by the network connectivity outage using the contextual data; and cause the local caching proxy server to apply a precaching strategy to precache content prior to the network connectivity outage and serve the precached content to the affected application during the network connectivity outage.

Example 22 includes the subject matter of Example 21, and wherein the prediction engine is to predict a start time and a duration of the network connectivity outage; and the local caching proxy server is to apply the precaching strategy to select content for the predicted duration of the network connectivity outage, and download the selected content prior to the predicted start time of the network connectivity outage.

Example 23 includes the subject matter of any of Examples 21 and 22, and wherein the local caching proxy server is to apply the precaching strategy to determine an amount of the precached content required to provide substantially continuous application service during the network connectivity outage; determine a network bandwidth required to concurrently (i) provide substantially continuous application service and (ii) download the required amount of precached content prior to the network connectivity outage; determine whether a currently available network bandwidth is sufficient as a function of the required network bandwidth; cause the affected application to provide reduced-quality continuous application service to reduce the required network bandwidth, in response to determining the currently available network bandwidth is not sufficient; and download the required amount of precached content prior to the network connectivity outage.

Example 24 includes the subject matter of any of Examples 21-23, and wherein the prediction engine is to predict a plurality of network connectivity outages and determine an average length of the plurality of network connectivity outages; and the local caching proxy server is to apply the precaching strategy to determine a required buffer size as a function of the average length of the plurality of network connectivity outages; determine whether a current buffer size of the affected application is sufficient as a function of the required buffer size; and adjust the current buffer size of the affected application to the required buffer size, in response to determining that the current buffer size is not sufficient.

Example 25 includes a method to predictively precache data on a mobile communication device. The method includes monitoring, on the mobile communication device, contextual data of a user of the mobile communication device; predicting, on the mobile communication device, a network connectivity outage using the contextual data; predicting, on the mobile communication device, an application affected by the network connectivity outage using the contextual data; applying, on the mobile communication device, a precaching strategy for the affected application to precache content prior to the network connectivity outage.

Example 26 includes the subject matter of Example 25, wherein predicting the affected application comprises predicting the affected application using a Bayesian prediction method.

Example 27 includes the subject matter of any of Examples 25 and 26, and wherein monitoring the contextual data comprises monitoring the contextual data using a security coprocessor of the mobile communication device; predicting the network connectivity outage comprises predicting the network connectivity outage using the security coprocessor; and predicting the affected application comprises predicting the affected application using the security coprocessor.

Example 28 includes the subject matter of any of Examples 25-27, and wherein monitoring the contextual data comprises monitoring the contextual data in a secure execution environment of the mobile communication device; predicting the predicted network connectivity outage comprises predicting the predicted network connectivity outage in the secure execution environment; and predicting the affected application comprises predicting the affected application in the secure execution environment.

Example 29 includes the subject matter of any of Examples 25-28, and wherein predicting the network connectivity outage comprises determining a bandwidth threshold required by the mobile communication device and determining an expected bandwidth for a future time period that is below the bandwidth threshold.

Example 30 includes the subject matter of any of Examples 25-29, and wherein monitoring the contextual data of the user comprises monitoring a calendar of the user; and predicting the network connectivity outage comprises predicting the network connectivity outage as a function of the calendar of the user.

Example 31 includes the subject matter of any of Examples 25-30, and wherein monitoring the contextual data of the user comprises determining a location of the mobile communication device; and predicting the network connectivity outage comprises predicting the network connectivity outage as a function of the location of the mobile communication device and a network coverage map identifying areas of reduced network connectivity.

Example 32 includes the subject matter of any of Examples 25-31, and wherein predicting the network connectivity outage as a function of the location of the mobile communication device and the network coverage map comprises downloading the network coverage map; predicting a route of the mobile communication device as a function of the location of the mobile communication device; and predicting the network connectivity outage as a function of the network coverage map and the predicted route of the mobile communication device.

Example 33 includes the subject matter of any of Examples 25-32, and further includes determining an alternate route as a function of the location of the mobile communication device and the predicted route of the mobile communication device, and presenting the user with the alternate route.

Example 34 includes the subject matter of any of Examples 25-33, and wherein downloading the network coverage map comprises downloading the network coverage map from a third-party network connectivity map server, wherein the third-party network connectivity map server maintains a crowdsourced connectivity map with connectivity information provided by other mobile communication devices.

Example 35 includes the subject matter of any of Examples 25-34, and wherein monitoring the contextual data of the user comprises monitoring the network connectivity status of the mobile communication device and recording historical network connectivity status information; and predicting the network connectivity outage comprises predicting the network connectivity outage as a function of the historical connectivity status information.

Example 36 includes the subject matter of any of Examples 25-35, and wherein monitoring the contextual data of the user comprises monitoring a usage of an application by the user and recording historical application usage data of the user; and predicting the affected application comprises predicting the affected application as a function of the historical application usage data.

Example 37 includes the subject matter of any of Examples 25-36, and wherein predicting the network connectivity outage comprises predicting a start time and a duration of the network connectivity outage; and applying the precaching strategy comprises selecting content for the predicted duration of the network connectivity outage, and downloading the selected content prior to the predicted start time of the network connectivity outage.

Example 38 includes the subject matter of any of Examples 25-37, and wherein selecting content comprises selecting content from a user-specified content queue.

Example 39 includes the subject matter of any of Examples 25-38, and wherein selecting content comprises selecting content using a content prediction heuristic.

Example 40 includes the subject matter of any of Examples 25-39, and wherein downloading the selected content comprises negotiating content permissions with a content server prior to the predicted start time of the network connectivity outage.

Example 41 includes the subject matter of any of Examples 25-40, and wherein downloading the selected content comprises scheduling the download of the selected content for a future time prior to the predicted start time of the network connectivity outage.

Example 42 includes the subject matter of any of Examples 25-41, and wherein applying the precaching strategy comprises determining an amount of the precached content required to provide substantially continuous application service during the network connectivity outage; determining a network bandwidth required to concurrently (i) provide substantially continuous application service and (ii) download the required amount of precached content prior to the network connectivity outage; determining whether a currently available network bandwidth is sufficient as a function of the required network bandwidth; providing reduced-quality continuous application service to reduce the required network bandwidth, in response to determining the currently available network bandwidth is not sufficient; and streaming data to concurrently provide continuous application service and download the required amount of precached content prior to the network connectivity outage.

Example 43 includes the subject matter of any of Examples 25-42, and wherein predicting the network connectivity outage comprises predicting a plurality of network connectivity outages and determining an average length of the plurality of network connectivity outages; and applying the precaching strategy comprises determining a required buffer size as a function of the average length of the plurality of network connectivity outages; determining whether a current buffer size of the application is sufficient as a function of the required buffer size; and adjusting the current buffer size of the application to the required buffer size, in response to determining that the current buffer size is not sufficient.

Example 44 includes the subject matter of any of Examples 25-43, and further includes notifying, on the mobile computing device, the affected application of the network connectivity outage.

Example 45 includes the subject matter of any of Examples 25-44, and further includes accessing, on the mobile computing device, the precached content during the network connectivity outage.

Example 46 includes the subject matter of any of Examples 25-45, and wherein applying the precaching strategy comprises precaching the content using a local caching proxy server established on the mobile communication device; and accessing the precached content comprises accessing the precached content served by the local caching proxy server.

Example 47 includes a mobile communication device having a processor and a memory having stored therein a plurality of instructions that when executed by the processor cause the mobile communication device to perform the method of any of claims 25-46.

Example 48 includes one or more machine readable storage media comprising a plurality of instructions stored thereon that in response to being executed result in a mobile communication device performing the method of any of claims 25-46.

The invention claimed is:

1. A mobile communication device to predictively precache data, the mobile communication device comprising:
   a contextual engine to monitor contextual data of a user of the mobile communication device; and
   a prediction engine to:
      predict a network connectivity outage associated with a computer network using the contextual data;
      predict an application affected by the network connectivity outage using the contextual data, wherein the application comprises a computer program that accesses content via the computer network; and
      cause the affected application to apply a precaching strategy to precache content prior to the network connectivity outage.

2. The mobile communication device of claim 1, further comprising a security coprocessor, the security coprocessor comprising the contextual engine and the prediction engine.

3. The mobile communication device of claim 1, further comprising a secure execution environment, the secure execution environment comprising the contextual engine and the prediction engine.

4. The mobile communication device of claim 1, further comprising a location determination circuit, wherein:
   the contextual engine is to monitor the contextual data of the user by determining a location of the mobile communication device using the location determination circuit; and
   the prediction engine is to predict the network connectivity outage as a function of the location of the mobile communication device and a network coverage map identifying areas of reduced network connectivity.

5. The mobile communication device of claim 1, wherein the prediction engine is to:
   predict a start time and a duration of the network connectivity outage; and
   cause the affected application to apply the precaching strategy to:
      select content for the predicted duration of the network connectivity outage, and
      download the selected content prior to the predicted start time of the network connectivity outage.

6. The mobile communication device of claim 1, wherein the prediction engine is to cause the affected application to apply the precaching strategy to:
   determine an amount of the precached content required to provide substantially continuous application service during the network connectivity outage;
   determine a network bandwidth required to concurrently (i) provide substantially continuous application service and (ii) download the required amount of precached content prior to the network connectivity outage;
   determine whether a currently available network bandwidth is sufficient as a function of the required network bandwidth;
   provide reduced-quality continuous application service to reduce the required network bandwidth, in response to determining the currently available network bandwidth is not sufficient; and
   stream data to concurrently provide continuous application service and download the required amount of precached content prior to the network connectivity outage.

7. The mobile communication device of claim 1, wherein the prediction engine is to:
   predict the network connectivity outage by predicting a plurality of network connectivity outages and determining an average length of the plurality of network connectivity outages; and
   cause the affected application to apply the precaching strategy to:
      determine a required buffer size as a function of the average length of the plurality of network connectivity outages;
      determine whether a current buffer size of the application is sufficient as a function of the required buffer size; and
      adjust the current buffer size of the application to the required buffer size, in response to determining that the current buffer size is not sufficient.

8. The mobile communication device of claim 1, wherein the prediction engine comprises a prediction engine to notify the affected application of the network connectivity outage to cause the affected application to (i) apply the precaching strategy for the affected application to precache content prior to the network connectivity outage and (ii) access the precached content during the network connectivity outage.

9. A method to predictively precache data on a mobile communication device, the method comprising:
   monitoring, on the mobile communication device, contextual data of a user of the mobile communication device;
   predicting, on the mobile communication device, a network connectivity outage associated with a computer network using the contextual data;
   predicting, on the mobile communication device, an application affected by the network connectivity outage using the contextual data, wherein the application comprises a computer program that accesses content via the computer network; and
   applying, on the mobile communication device, a precaching strategy for the affected application to precache content prior to the network connectivity outage.

10. The method of claim 9, wherein:
monitoring the contextual data of the user comprises determining a location of the mobile communication device; and
predicting the network connectivity outage comprises predicting the network connectivity outage as a function of the location of the mobile communication device and a network coverage map identifying areas of reduced network connectivity.

11. The method of claim 9, wherein:
monitoring the contextual data of the user comprises monitoring the network connectivity status of the mobile communication device and recording historical network connectivity status information; and
predicting the network connectivity outage comprises predicting the network connectivity outage as a function of the historical connectivity status information.

12. The method of claim 9, wherein:
predicting the network connectivity outage comprises predicting a start time and a duration of the network connectivity outage; and
applying the precaching strategy comprises:
selecting content for the predicted duration of the network connectivity outage, and
downloading the selected content prior to the predicted start time of the network connectivity outage.

13. The method of claim 9, wherein applying the precaching strategy comprises:
determining an amount of the precached content required to provide substantially continuous application service during the network connectivity outage;
determining a network bandwidth required to concurrently (i) provide substantially continuous application service and (ii) download the required amount of precached content prior to the network connectivity outage;
determining whether a currently available network bandwidth is sufficient as a function of the required network bandwidth;
providing reduced-quality continuous application service to reduce the required network bandwidth, in response to determining the currently available network bandwidth is not sufficient; and
streaming data to concurrently provide continuous application service and download the required amount of precached content prior to the network connectivity outage.

14. The method of claim 9, wherein:
predicting the network connectivity outage comprises predicting a plurality of network connectivity outages and determining an average length of the plurality of network connectivity outages; and
applying the precaching strategy comprises:
determining a required buffer size as a function of the average length of the plurality of network connectivity outages;
determining whether a current buffer size of the application is sufficient as a function of the required buffer size; and
adjusting the current buffer size of the application to the required buffer size, in response to determining that the current buffer size is not sufficient.

15. One or more non-transitory, machine readable media comprising a plurality of instructions that in response to being executed result in a computing device:
monitoring contextual data of a user of the mobile communication device;
predicting a network connectivity outage associated with a computer network using the contextual data;
predicting an application affected by the network connectivity outage using the contextual data, wherein the application comprises a computer program that accesses content via the computer network; and
applying a precaching strategy for the affected application to precache content prior to the network connectivity outage.

16. The machine readable media of claim 15, wherein
monitoring the contextual data of the user comprises monitoring a calendar of the user; and
predicting the network connectivity outage comprises predicting the network connectivity outage as a function of the calendar of the user.

17. The machine readable media of claim 15, wherein:
monitoring the contextual data of the user comprises determining a location of the mobile communication device; and
predicting the network connectivity outage comprises predicting the network connectivity outage as a function of the location of the mobile communication device and a network coverage map identifying areas of reduced network connectivity.

18. The machine readable media of claim 15, wherein:
monitoring the contextual data of the user comprises monitoring the network connectivity status of the mobile communication device and recording historical network connectivity status information; and
predicting the network connectivity outage comprises predicting the network connectivity outage as a function of the historical connectivity status information.

19. The machine readable media of claim 15, wherein:
predicting the network connectivity outage comprises predicting a start time and a duration of the network connectivity outage; and
applying the precaching strategy comprises:
selecting content for the predicted duration of the network connectivity outage, and
downloading the selected content prior to the predicted start time of the network connectivity outage.

20. The machine readable media of claim 15, wherein applying the precaching strategy comprises:
determining an amount of the precached content required to provide substantially continuous application service during the network connectivity outage;
determining a network bandwidth required to concurrently (i) provide substantially continuous application service and (ii) download the required amount of precached content prior to the network connectivity outage;
determining whether a currently available network bandwidth is sufficient as a function of the required network bandwidth;
providing reduced-quality continuous application service to reduce the required network bandwidth, in response to determining the currently available network bandwidth is not sufficient; and
streaming data to concurrently provide continuous application service and download the required amount of precached content prior to the network connectivity outage.

21. The machine readable media of claim 15, wherein:
predicting the network connectivity outage comprises predicting a plurality of network connectivity outages and determining an average length of the plurality of network connectivity outages; and applying the precaching strategy comprises:
- determining a required buffer size as a function of the average length of the plurality of network connectivity outages;
- determining whether a current buffer size of the application is sufficient as a function of the required buffer size; and
- adjusting the current buffer size of the application to the required buffer size, in response to determining that the current buffer size is not sufficient.

22. The machine readable media of claim 15, wherein the plurality of instructions further result in the computing device notifying the affected application of the network connectivity outage.

23. The machine readable media of claim 15, wherein the plurality of instructions further result in the computing device accessing the precached content during the network connectivity outage.

* * * * *